(12) United States Patent
Chien

(10) Patent No.: US 7,726,869 B2
(45) Date of Patent: Jun. 1, 2010

(54) LED TRACK LIGHT DEVICE

(76) Inventor: Tseng-Lu Chien, 8F, No. 29, Alley 73, Lin-Shen Rd., Shi-Chi Town, Taipei Hseng (TW)

( * ) Notice: Subject to any disclaimer, the term of this patent is extended or adjusted under 35 U.S.C. 154(b) by 0 days.

(21) Appl. No.: 12/073,095

(22) Filed: Feb. 29, 2008

(65) Prior Publication Data
US 2008/0212323 A1    Sep. 4, 2008

(51) Int. Cl.
*H01R 33/00* (2006.01)
(52) U.S. Cl. .................. 362/648; 362/249.07; 362/294
(58) Field of Classification Search .............. 362/145, 362/276, 404, 382, 250, 249.07, 294, 648
See application file for complete search history.

(56) References Cited
U.S. PATENT DOCUMENTS
2003/0179578 A1* 9/2003 Albert et al. ............... 362/276
* cited by examiner

*Primary Examiner*—John A Ward
(74) *Attorney, Agent, or Firm*—Bacon & Thomas, PLLC

(57) ABSTRACT

An LED track light device includes a plurality of LED-units that fit within a track means. At least one LED element(s) is fitted within the LED-unit's geometric construction, and leads of the LED are connected by conductive means, resilient conductive means, contact means, and/or bus means to deliver electric signal from an AC or DC power source, circuit means, switch means, sensor means, timer means, and/or control means to the element(s) to provide a desired area-illumination light function. The LED-units have a geometric construction and space to allow the element(s) to be fixed in position or incorporated with reflector means that may be arranged to rotate, swivel, or tilt. Hanging means or other electric devices also can added to the said LED track light device or the LED-units to add more practical extra functions.

18 Claims, 5 Drawing Sheets

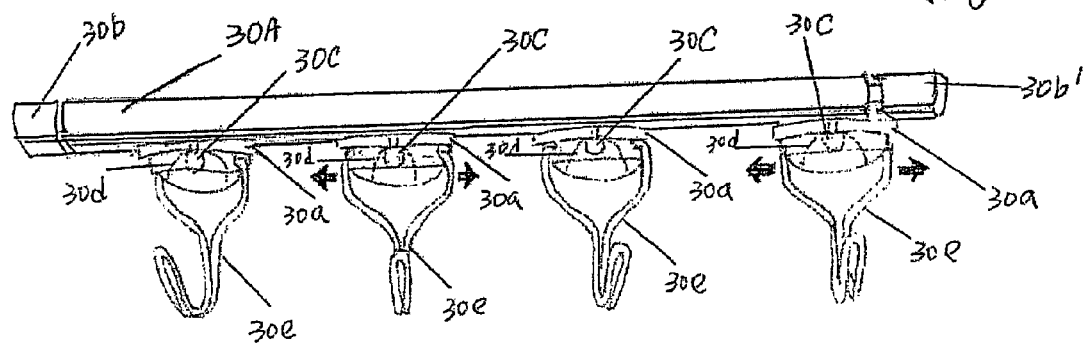
(Fig 3)
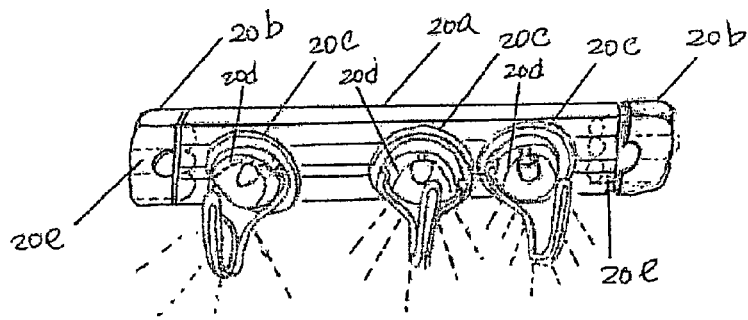
(Fig 2)
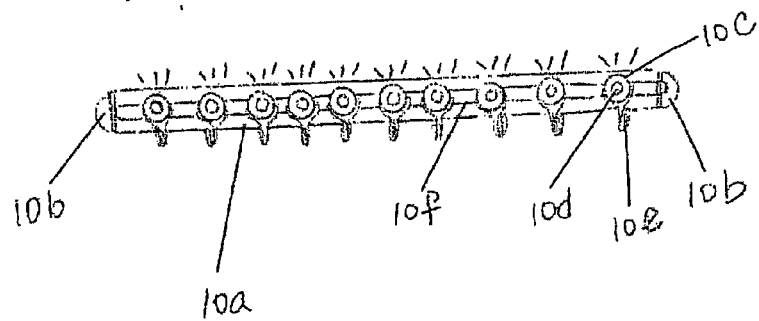
(Fig 1)

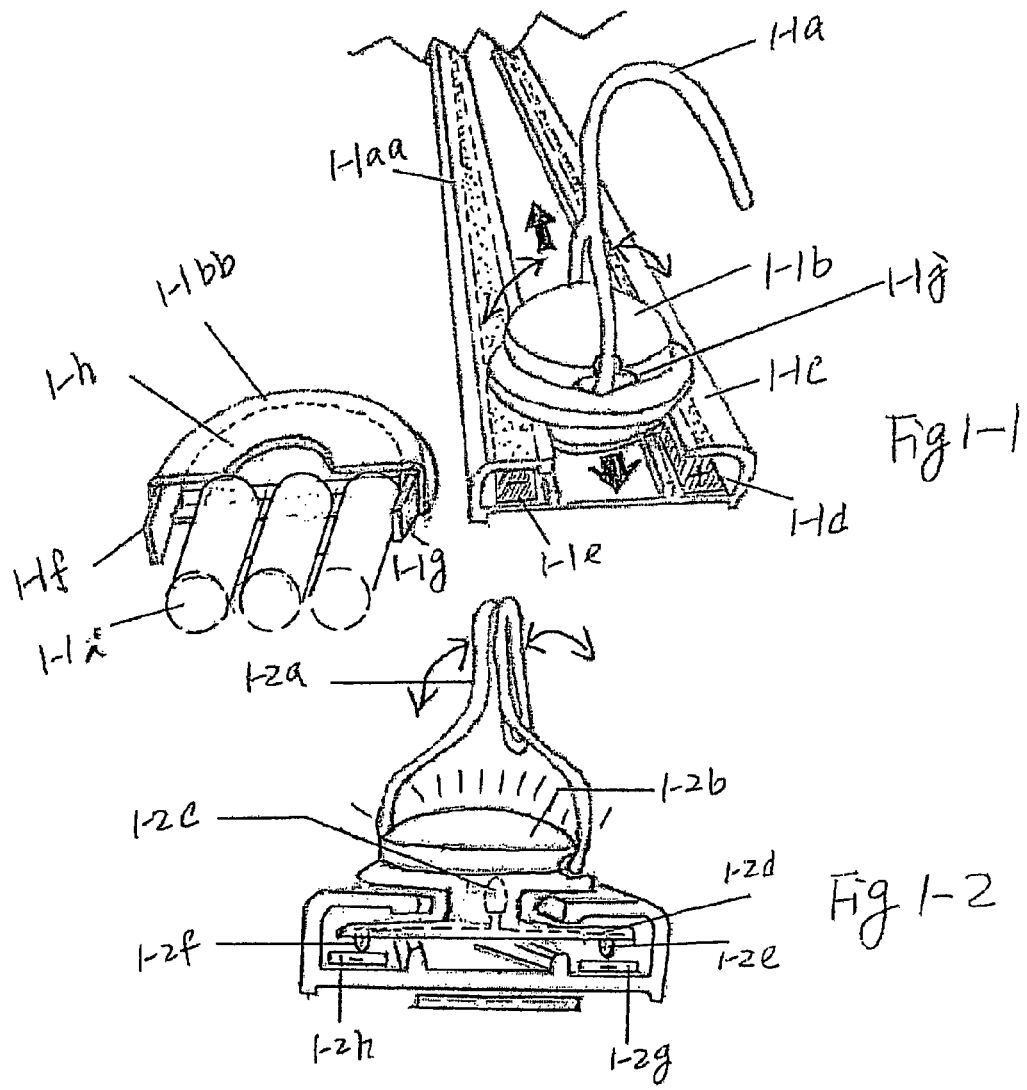
Fig 1-1
Fig 1-2
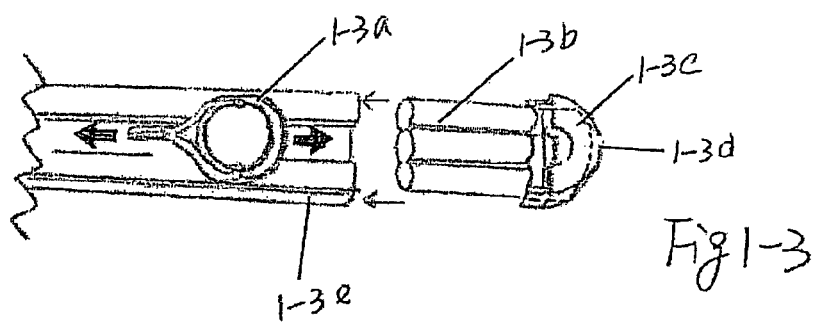
Fig 1-3

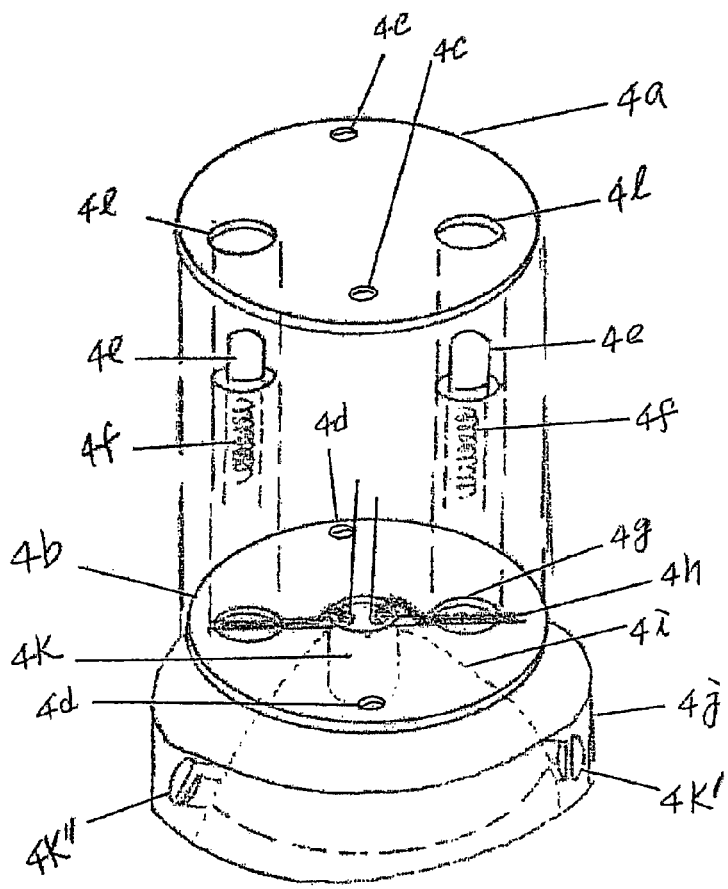
Fig 4
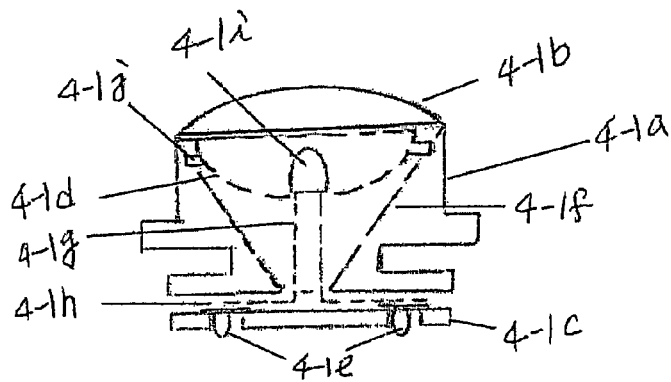
Fig 4-1
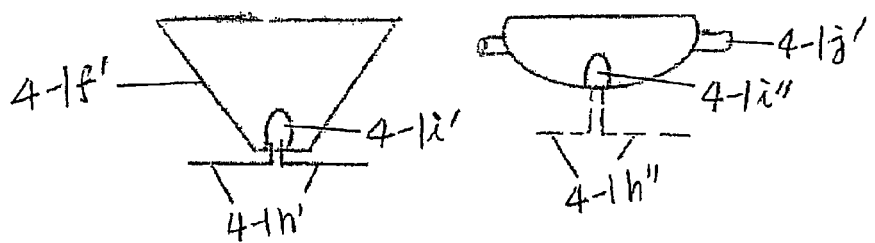

LED TRACK LIGHT DEVICE

BACKGROUND OF THE INVENTION

This application has subject matter in common with or related to the subject matter of copending U.S. patent application Ser. Nos. 12/073,889 (LED Light with Changeable LED Position with Preferable Power Source); 12/007,076 (LED Light Device with Changeable Geometric System); 12/003,809 (LED Light Device with Changeable Features) 12/003,691 (LED Light Device with Changeable Features of Geometric Dimension); 11/806,711; 11/527,631 (LED Night Light with Interchangeable Display Unit); 11/498,881 (Poly Night Light); 11/255,981 (Multiple Light Source Night Light); 11/094,215 (LED Night Light with Liquid Optics Medium); 11/092,741 (Night Light with Fiber Optics); 10/883,747 (Fiber Optic Light Kits for Footwear); 11/498,874 (Area Illumination for LED Night Light); 11/527,629 (Time Piece with LED Night Light); 11/527,628 (Multiple Function Night Light with Air Freshener); 11/806,284 (LED Night Light with More Than One Optics Medium); Ser. No. 11/806,285 (LED Night Light with Multiple Functions); and 11/806,711 (Multiple LEDs Light with Adjustable Angle Function).

The track light device of the current invention includes a plurality of LED-units whose position along a track means can be changed by manually moving the LED-units. The current invention has a simpler construction than the LED units described in copending U.S. patent application Ser. Nos. 12/007,076; 12/003,809; 11/806,711; 11/806,285; 11/806,284; 11/527,628; 11/527,629; 11/498,874; 11/527,631; 11/498,881; 11/255,981; 11/184,771; 11/12,063; 11/094,215; 11/092,742; 11/092,741; and in the above listed copending cases.

The track means includes bus-means to deliver electric signals from the power source and change the power source electric signals by circuit means to trigger the LED-unit's LED or LEDs for a desired light performance. Each LED-unit has a desired number of one or more LEDs that fit into the LED-unit with conductive means, resilient conductive means, or contact-means that enable the moveable LED-units to freely move within the track means and always connect the bus-means to deliver electric signals to the LED or LEDs.

The current track light device includes the following features:
1. It is easy to replace the LED-units.
2. A user can add or reduce the LED-units at any time.
3. The user can easily replace batteries when using a DC power source.
4. The user can easily plug the electric plug into a wall outlet adaptor when using an AC power source.
5. The track means have space to arrange the DC or AC power source and its parts in a compartment.
6. The LED-units may optionally incorporate rotating means to make the light beams adjustable 360 degrees (as also disclosed in a co-pending filing)
7. LED-units may optionally incorporate hanging means to more increase practicality and add to the value of the current invention, and the hanging means also be adjustable to different angles for different installations.
8. The circuit means may incorporate an integrated circuit to provide desired light functions, the integrated circuit being selected from a conventional market available type, and/or the circuit means may incorporate sensor means, motion sensor means, photo sensor means, or mechanical or electric switch means to make the LED light device more practical and enable the consumer to have a better life.
9. The track means material may be selected from a bendable, cuttable material so as to allow the consumer to make it shorter to fit into a limited space.
10. All LED-units are arranged in-parallel to facilitate adding or reducing the desired number of LED-units because LED element power consumption is very low so there is no need, unlike, for example a halogen bulb, for each unit to carry its own circuit and transformer, which would be way too risky since a bulb with its own circuit and transformer could fall off and kill the people from a high location. The LED track light can use the bus means with LED trigger current which is safe because of the low current and voltage so no harm can come to people, and thereby permit the LED-units to be arranged in parallel.

All these features can make a big improvement for consumer life and enable the LED track light to become a universal LED light device for people for their house, kitchen, under cabinet, bath room, garage, wash room, closet, stair, front door, garden, swimming pool, spa, patio, public area, stair, van, car, boat, or airplane or anywhere that needs a good light fixture with super low power consumption or green energy light fixtures.

A preferred construction of the current track light device is as follows:

At least LED-unit is arranged within a track means with position and/or location changing features.

The LED-units have a geometric design, shape, and construction to fit within the track means to allow light to be emitted in a desired direction for area illumination.

At least one LED element fits within the LED-unit such that the element's electric leads connect with conductive means, resilient conductive means, contact-means, or bus means to deliver electric signals from a preferred power source and circuit means to the leads.

At least one pair of bus-means are arranged within the track means to deliver electric signals from the power source and circuit means to the element's terminals for illumination under predetermined function, duration, brightness, colors, and performance.

The track means has a geometric shape, design, and dimension which offers space to accommodate the power source, circuit means, bus means, and related parts to supply AC or DC signals to the LED elements of the LED units.

The track light device can be installed on a main object surface by conventional available attachment means.

The LED-units may include optional rotating means to adjust each unit's light beam to a desired direction for area illumination.

The LED-units and track light device may incorporate hanging means to add the other functions.

The principles of the current invention may have wider application to cover different light means, including an incandescent bulb, fluorescent lamp, halogen bulb, electro-luminescent elements, cold cathode tube, and any other conventional light means available from the market place and that have the same function or equivalent functions with the LEDs or LED-unit to offer illumination to all people by endowing the light means with geometric shape, size, and dimension changeable features that enable the orientation, position etc. of the light means to be changed

BRIEF DESCRIPTION OF THE DRAWINGS

FIG. 1 shows an LED track light device with a plurality of the LED-units arranged along a track means so that each LED-units' position and light emitting direction can be changed relative to those of other LEDs according to a first preferred embodiment of the invention.

FIG. 1-1 shows construction details of the LED track light device of the first preferred embodiment.

FIG. 1-2 shows an arrangement for enabling the LED-units of the first preferred embodiment to connect with bus-means though contact-points and.

FIG. 1-3 an end-piece with a DC or AC power source and circuit board according to the first preferred embodiment.

FIG. 2 shows further details of the construction of the first preferred embodiment.

FIG. 3 shows still further details of the construction of the first preferred embodiment.

FIG. 4, FIG. 4-1, and FIG. 4-2 show details of the construction of the LED-units of the first preferred embodiment.

DETAIL DESCRIPTION OF THE PREFERRED EMBODIMENTS

The current invention is a track light device with at least nine features, listed above, to improve people's living.

As shown in FIG. 1, an LED track light device according to a preferred embodiment of the invention is installed on a wall surface by conventional attachment means. The LED track light device has an elongate shape, and includes track means (10a) and two end-covers (10b) on each end. A plurality of LED-units (10c) are securely installed within the track means (10a) and arranged so that a position and location of the LED-units can easily be changed. An appropriate switch means, sensor means, motion sensor, photo sensor, or electric or mechanical switch may be added on the LED track light device to drive the LED-units for desired illumination with a predetermined function, duration, timing, color, and brightness.

Each of the LED-units may have hanging means (10e) attached on the LED-units, the hanging means having an adjustable angle and can be fixed at the desired angle for hanging other devices without blocking the light beam.

Figures 2, 4:
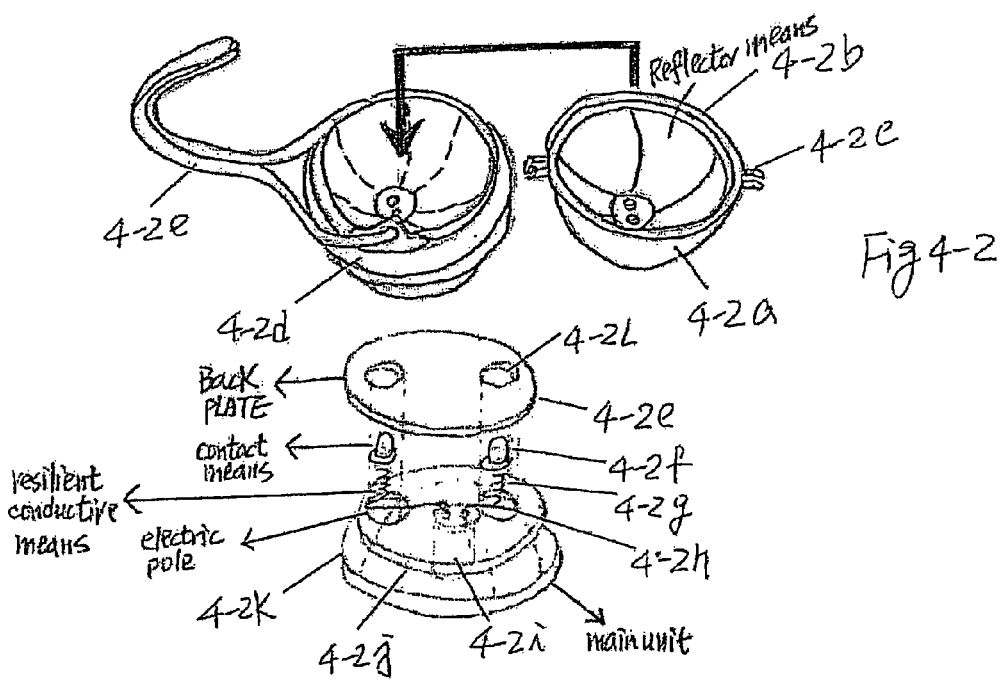

As shown in FIG. 2, the LED track light device is installed on the main object's surface by double side foam tape, or screw, nail, or hook means. Three LED-units (20c) fit within the track means (20a) with two end-covers (20b) on each end. Each LED-unit (20c) has an LED element arranged with a reflector means (20d) to cause the light beam to have better photometric performance. The reflector means (20d) also can offer a rotating angle of 360 degrees and tilt adjustment to a certain angle when the reflector means is manually twisted or adjusted, as also disclosed in U.S. patent application Ser. Nos. 11/806,711, 12/003,809, and 12/007,076, incorporated by reference herein. The three LED-units shown in FIG. 2 all emit light in different directions as shown in the drawing. The hanging means in this illustration are vertical with respect to the track means, which is not same as shown in FIG. 1, in which all the hanging means (10e) are parallel with the track means (10a), thereby illustrating the angle adjustment feature of hangers of the preferred embodiment.

As shown in FIG. 2, the two end-covers (20b) have space to accommodate the power source (20e), which can be (1) a DC power source in the form of the batteries, or (2) an AC power source in the form of an electric plug and cord to be connected with a wall outlet. Both types of power source may be incorporated with a sensor means, switch means, motion sensor, timer, and/or electric or mechanical switch means to drive the LED track light device for illumination. It will be appreciated by those skilled in the art that the battery can be powered by solar power, wind power, or a generator so that the track light device can be an energy saving device and is not limited to battery power only.

FIG. 3 shows an LED track light device that may be installed under the cabinet of a kitchen or wash room. The light device has four LED-units (30a) that fit within the said track means (30A). Each of the LED-units (30a) has an LED element (30c) incorporated with reflector means (30d) and preferably a rotating means (not shown) and rod (not shown) to allow the reflector means to rotate and tilt to change the illumination angle, according to the arrangement described in copending U.S. patent application Ser. Nos. 11/806,711, 12/003,809, and 12/007,076.

The hanging means (30e) in this illustration are vertical to the track means (30A), which is different from the hanging means of FIG. 1.

As shown in FIG. 1-1, LED track light device has track means (1-1aa) having an elongate shape with two ends. Each end has an end-cap (1-1bb) which has space to accommodate the circuit means (1-h) and batteries (1-1i) within, and has conductive means to connect with a bus means (1-1d) (1-1e) connectors (1-1f) (1-1g) are joined with the track means (1-1aa) to deliver an electric signal from the circuit means (1-1h) to the bus means (1-1d) (1-1e). The pair of bus means (1-1d) and (1-1e) are separated by two isolating walls to make sure there is no risk of electric shock. The bus means (1-1d) (1-1e) includes a pair of wires for the (+) and (−) electric signals of this preferred embodiment. It will be appreciated that for some application, the bus means may have a higher number of wires or conductors such as three of the (+) wires and 1 common (−) wire to drive the multiple color LED chip or drive three LEDs. Additional bus means, such as six sets of three (+) and one common (−) may be provided to drive six groups of multiple color LEDs or drive six groups of three LEDs each. This desired LED or LEDs and the functions demanded by the market, so that the bus means can be any number for the LED track light device.

All LED-units are arranged in-parallel so adding or reducing the desired number of LED-units is simple and LED element power consumption is very low, unlike for example a halogen bulb for which each unit would need to carry its own circuit and transformer, resulting in the risk of fatalities if the lighting unit falls of the track. The LED track light can use the bus means with LED trigger current because its low current and voltage pose no risk of harm to people. As illustrated in FIG. 1-1, the LED-unit (1-1b) has an opaque lens to enable the strong spot light emitted by the inner LED element to become a soft light. The LED-units lens can be any color with desired stencil, printing, logo, design on the lens to exhibit a desired commercial promotion or other advertisement. The bus means (1-1d) (1-1e) extend along the whole length of the track means (1-1aa) to allow the LED-units to always connect with the electric signal and provide a predetermined light function. The LED-units (1-1b) have a plurality of cut-outs, ditches, or groove to allow the hanging means (1-1a) to be adjustable to a desired angle and hang other products.

FIG. 1-2 shows details of the LED track light device of the preferred embodiment which should not be taken as limiting the current invention's scope. It will be appreciated that any alternative, or equivalent, with a similar or same function, arrangement, method, and/or construction would still fall within the scope of the current invention. The LED track light device shown in FIG. 1-2 has an LED-unit (12b), hanging means (1-2a), LED elements (1-2c), element electric-leads or leads (12d), contact means (1-2e) (1-2f), and bus means (1-2g) (1-2g). The LED elements (1-2c) are arranged inside the LED-unit (1-2b) with its two electric leads (1-2d) being bent into a 90 degree to the right and left side. One resilient conductive means (not shown) is respectively sandwiched between each of the element leads and within the dome shape contact-means (1-2e). The dome shape contact means (1-2e) has a resilient function to allow people to change the LED-unit's position easily or replace the LED-units easily. The resilient function of the contact means (1-2e) (1-2f) also allows tight contact to be made with the bus means (1-2g) (1-2h) at any time. The attachment means can use double side foam tape on the back of the track means so allow the track to be attached to a main object surface.

As shown in FIG. 1-3, the end-covers (1-3d) are joined with the track means (1-3e) by snap tight or other connector-means available from the conventional market place. The end-covers (1-3d) have space to accommodate DC power source related parts or AC power source related parts within to provide the consumer with a nice and neat LED light device with any preferred power source, such as batteries, a wall outlet AC power source through an electric plug and cord, solar power, wind power, water power, chemical power, generator power or any other power type known from physics.

As shown in FIG. 4, the LED-unit has a main body (4b) and lower plate (4a) assembled together by fastening means (4c) and (4d), such as by a screw or other equivalent fastening means available from the marketplace. The LED elements (4K) fit within the reflector means (4i) with at least two leads (4h) bent into a 90 degree angle to the right and left side and connected with resilient conductive means (4f). The resilient conductive means is preferably a conductive metal spring coil which has retractable properties when force is applied so that when pressed it will be short and when the force is released, it will become longer at once. It will be appreciated that alternative resilient conductive means can be used to replace the metal spring coil and still fall within the current scope of the invention. The resilient conductive means (4f) fit between the conductive means in a dome shape with edge (4e) and the elements electric leads (4h) so complete the electric signal delivery from the top of the dome shape of the contact means (4e) through the resilient conductive means (4f) to LED leads (4h). The resilient conductive means (4f) will become short when pressed against the dome shape contact means (4e) by a person wanting to install an LED-unit into the track means. The resilient conductive means (4f) will become longer when the dome shape contact means (4e) is released and make electric connect with the bus means within the track means (not shown). This will offer people a simple and easy way to replace, add, or reduce the number of LED-units in the said LED track light device. An alternative method is to use the resilient contact means to provide an electrical connection directly between the LED elements and the bus means, such alternative still falling within the scope of the current invention.

FIG. 4-2 includes two drawings, one of which shows a reflector means (4-2b) with rotating means (4-2c) on both sides to allow the LED-unit to rotate, swivel, tilt, and change angles. The reflector means (4-2b) is also provided with its own track means (not shown) within the LED-units main-unit space. (This is the same as disclosed in the co-pending U.S. patent application Ser. Nos. 11/806,711, 12/003,809, and 12/007,076.) The other drawing an LED-unit's preferred construction. It is to be appreciated that all parts of the LED-unit described in the following discussion can have an alternative or equivalent design based on market requirements and still fall within the current invention's scope.

As shown in FIG. 4-1, the reflector means (4i) has a rod (4K) to allow the rod to fit within the reflector's own track means (not shown) so as to enable the reflector means to rotate, tilt, or swivel to a desired angle and change the LED-unit's light emitting angle. (This aspect of the preferred embodiment is the same as disclosed in co-pending application Ser. Nos. 11/806,711, 12/003,809, and 12/007,076.)

As also shown in FIG. 4-1, the LED-unit has reflector means (4-1d) which are the same as described above in connection with FIG. 4 with respect to the angle adjustment features. However, it will be appreciated that the reflector means (4-1d) may not be needed for some low cost requirement. The LED-unit may be designed with a "V" shape empty channel (4-1f) inside of the LED-unit so as to eliminate the need for a complicated reflector means and its trace means for angle adjustment. The simple "V" shape empty channel (4-1f) still can allow the LED element to fit within and get good light effects too. The main differences between the reflector means (4-1d) and "V" shape empty channel (4-1f) are 1. cost, 2. complicated tooling and precisely adjustment requirements, 3. simple tooling, 4. angle adjustment, 5. different LED location based on the different construction, and 6. construction differences. However, both of the designs (4-1d) (4-1f) still have the change position and location features of the LED track light device. It will be appreciated that both designs still fall within the current invention scope. All alternative or equivalent arrangements also should be fall within the current invention scope.

As is apparent from the three views of FIG. 4-1, the LED-units may have different constructions to meet the different requirements. For example, some applications require an opaque lens on top, but some applications require a clear lens on top.

If the LED-units do not have an angle, tilt, swivel, or rotation adjustment function, the LED-unit needs several parts to assemble together including:

(1) a top lens (4-1b)

(2) a main unit (4-1a)

(3) an empty space design (hereof preferred as a V-shape empty space, but not limited to this V-shape design) to get the best photometric effect of the LED light beam, with LED elements (4-1i') installed on the lower position.

(3) contact means (4-1e)

(4) a back plate (4-1c)

If the said LED unit does have angle, tilt, swivel, or rotation adjustment functions, the preferred parts to assemble together will become:

(1) a top lens (4-1b)

(2) a main unit (4-1a)

(3) reflector means (41d) with rotating means (4-1j) and LED elements (4-1i) installed on the reflector means (4-1d)

(4) contact means (4-1e)

(5) a track means for the reflector means (6) a back plate (4-1c) to enable the swivel, rotating, tilt, or angle adjustment function.

It will be appreciated that the parts shown in FIG. 4-1 may be varied for certain requirements or purposes, and that any such alternative, equivalent, or replacement, with a same or similar function to provide a different construction, arrangement, or method may still fall within the current invention scope, which provides an LED track light device LED-units can change position and location, irrespective of the details of the light beam's performance and whether the LED unit is adjustable or not.

Figure 5:
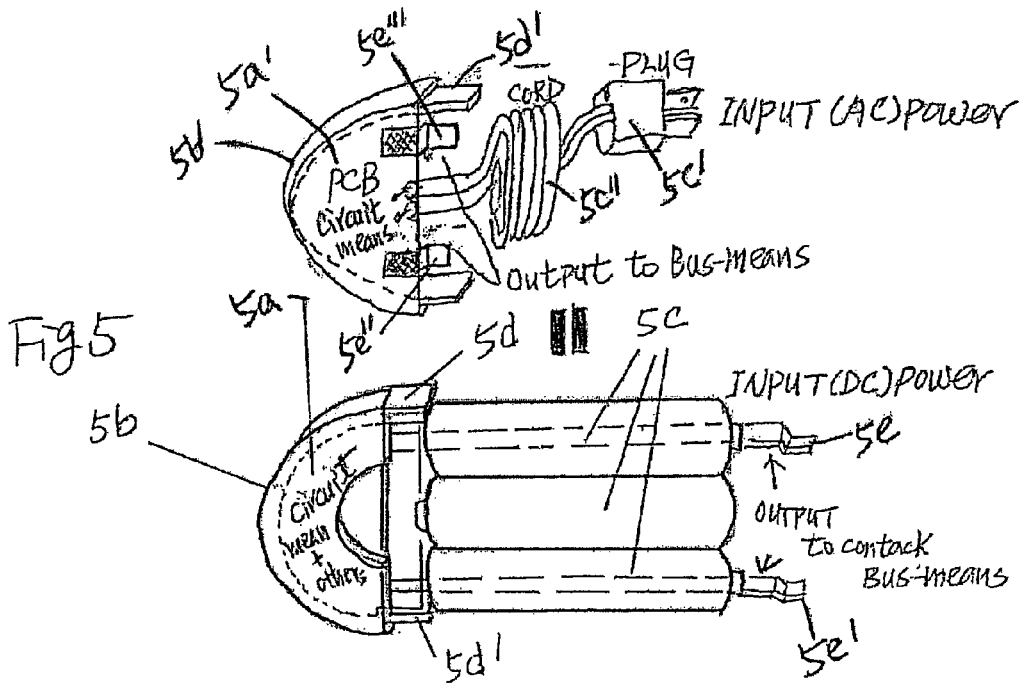
FIG. 5 a preferred end-piece with space to fit a DC power source and circuit means or an AC power cord and plug, for use with the first preferred embodiment.

As shown in FIG. 5, the two end-covers (5b) (5b') are designed for a DC power source and AC power source. The end-cover (5b) has a circuit means that may combined with other electric control means, switch means, sensor means, IC means, and/or conductive means to receive an input DC power source which may be selected from the group consisting of solar power, wind power, water power, chemical power, generator power or other power types known to physics. The circuit means (5a) has two conductive means (5e) (5e') to deliver the electric signal to the bus means on the track means. Similarly, the end-cover (5b') has space to store an electric cord (5c") and plug (5c') to connect with a wall outlet's AC power source. The plug (5c') and cord (5c") may arranged outside of the LED track light device. The plug (5c') and cord (5c") also can have a special do-it-yourself design in which the cord (5c") can be cut by a consumer and that allows consumers to assemble the plug (5c') by themselves, so the cord (5c") will not be too long for some limited areas. The plug (5c') and cord (5c") may have alternative, equivalent arrangements and still fall within the current invention scope.

The output ends (5e) (5e')(5e") (5e''') can be joined by resilient conductive means, traditional contact means, a quick-connector set, or other alternative or equivalent electric accessories to enable electric signal delivery from one end (output end) to other end(s) (bus means end) and still fall within the current invention scope.

Figure 6:
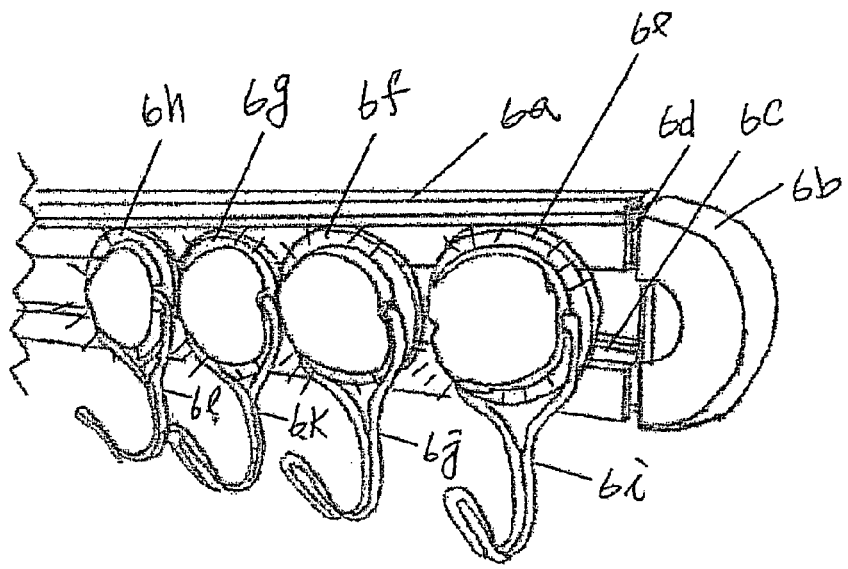
FIGS. 6, 7, and 8 show different views of the track light device of the first preferred embodiment.
Figure 7:
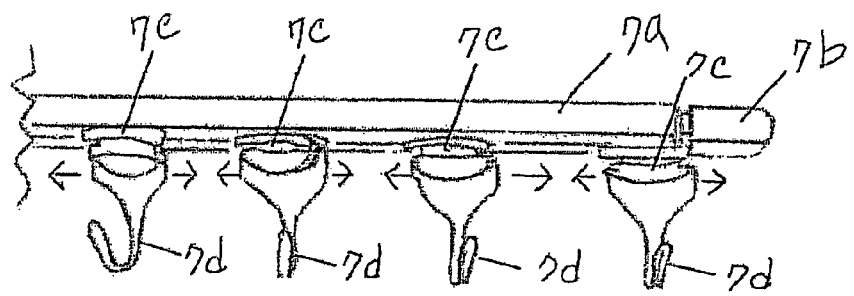
Figure 8:
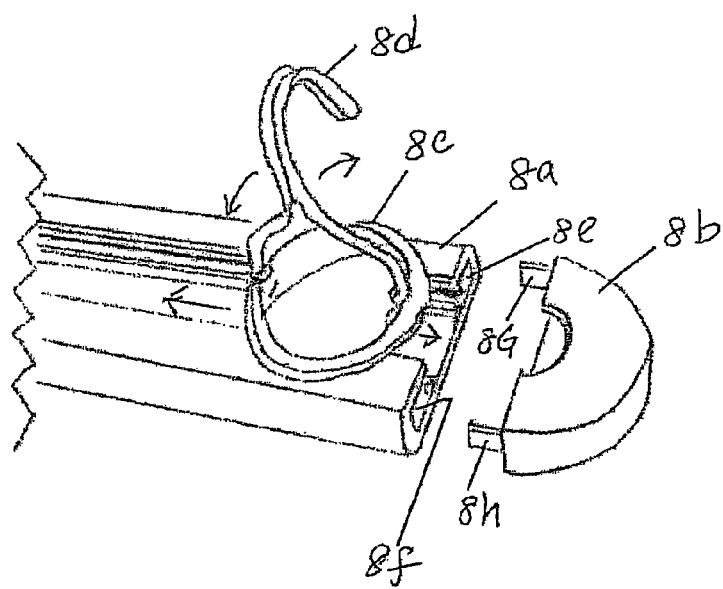

FIGS. 6 and 7 are different views of the LED track light device for installation on a vertical surface, as shown in FIG. 6, under a cabinet, on ceilings, or inside car, van, boat, truck, RV, or airplane as shown in FIG. 7. FIG. 8 shows details of the construction which are the same as shown in FIG. 1-1 but from a different viewing angle.

Having thus described preferred embodiments of the invention, it will be appreciated that any alternative or equivalent functions, design, construction, modification, or up-grade will still fall within the scope of the invention which is not limited to the above-discussed and mentioned details. In addition, any alternative or equivalent arrangement, process, installation or the like will also still fall within the scope of the current invention. Variable parts or features of the invention include the power source, conductive means, geometric shape of LED-units, connector-means, circuit means, sensor means, switch means, LED elements, attachment means, fixing-means, tightening means, resilient and conductive means.

The invention claimed is:

1. An LED track light device comprising:
   at least one LED-unit arranged within the track means and having position and location changeable features,
   wherein said LED-units have a geometric design, shape, and construction to fit within said track means to allow light beams to be emitted in a desired direction for area illumination,
   at least one LED element arranged to fit within each LED-unit and having leads arranged to connect with conductive means, the conductive means receiving electric signals from a resilient conductive means connected to a contact-means, a bus means connected to the resilient conductive means, circuit means connected to the bus means, and a power source connected to the circuit means, to deliver electric signals from the power source and circuit means to said to cause said LED element to illuminate,
   the improvement including:
   at least two of bus-means, each isolated from the other and arranged within the track means to deliver the electric signals from the power source and circuit means, to said element's leads for illumination according to a predetermined function, duration, brightness, colors, and performance,
   wherein the LED light device has a geometric shape, design, and dimensions that provide space to arrange or store the power source, circuit means, bus means, track means, conductive means, contact means, LED element leads, and power source related parts to supply the electric signal from AC or DC current supplied by said power source, and
   wherein the LED track light device is arranged to be attached to a main object by conventional available attachment means.

2. The LED track light device as claimed in claim 1, wherein the LED-units incorporate rotating means to cause said light beams to be emitted in a desired direction for area illumination.

3. The LED track light device as claimed in claim 1, wherein the LED-units or the said track light device further includes hanging means from which other objects or devices may be hung.

4. The LED track light device as claimed in claim 1, leads of the LED elements are connected with resilient conductive means and contact means to to enable a position and location of each of the LED-units to be manually changed to a desired position and location while maintaining electric connection with the bus means.

5. The LED track light device as claimed in claim 1, wherein the LED elements incorporate reflector means having a desired geometric shape with rotating means to to enable the reflector means to rotate, tilt, swivel in order to adjust the reflector means and elements.

6. The LED track light device as claimed in claim 1, further comprising hanging means for hanging objects or devices and which can be adjusted to a different angle and fixed at the different angle by a groove, ditch, hole, or cut-outs on the LED-units.

7. The LED track light device as claimed in claim 1, wherein the LED elements can be any number, color, brightness, shape, type, or specification selected from conventional available LED models.

8. The LED track light device as claimed in claim 1, wherein the LED track light device includes a switch means, sensor means, motion sensor, photo sensor, electric or mechanical switch timer means, other electric device(s), and/or an integrated circuit to provide desired illumination according to a predetermined function, duration, timing, color, or brightness.

9. The LED track light device as claimed in claim 1, wherein the bus means has a plurality of (+) and (−) conductors to drive a group of multiple color LEDs three LEDs with a desired light function by means of an integrated circuit (IC) and control means, sensor means, timer means, and/or other electric device(s).

10. The LED track light device as claimed in claim 1, wherein the track means has an end-cover which has space to arrange DC power source related parts or AC power source related parts within, or storage to provide the LED light device with power from batteries, a wall outlet AC power source through an electric plug and cord, solar power, wind power, water power, chemical power, generator power or other power types.

11. The LED track light device as claimed in claim 1, wherein the LED-unit has reflector means inside with extending poles and a track means inside the LED-unit to enable the reflector means rotate, tilt, swivel or adjust the angle, position, or orientation of the reflector means.

12. The LED track light device as claimed in claim 1, wherein the LED-unit has an empty space design to allow LED elements to create the best light performance.

13. The LED track light device as claimed in claim 1, wherein the LED-units are electrically connected in-parallel.

14. The LED track light device as claimed in claim 1, wherein the LED units are electrically connected in-parallel to facilitate adding or reducing a number of LED-units connected to the bus means.

15. The LED track light device as claimed in claim 1, wherein the electric signals within the bus means are DC signals to meet the LED elements trigger requirement.

16. The LED track light device as claimed in claim 1, wherein the electric signals input to the circuit means are AC or DC currents from different power sources and the desired electric signal is output from the circuit means.

17. The LED track light device as claimed in claim 1, wherein the LED light device includes other electric device(s) to provide multiple functions other than just illumination.

18. An LED-unit for a track light wherein:
said LED-units have a geometric design, shape, and construction to fit within said track means to allow light beams to be emitted in a desired direction for area illumination,
at least one LED element arranged to fit within each LED-unit and having leads arranged to connect with conductive means, the conductive means receiving electric signals from a resilient conductive means connected to a contact-means, a bus means connected to the resilient conductive means, circuit means connected to the bus means, and a power source connected to the circuit means, to deliver electric signals from the power source and circuit means to said LED element to cause said LED element to illuminate, and
wherein the LED-unit has resilient contact-means to allow people to easily change LED-unit position and location while maintaining electric connection with the bus means.

* * * * *